(12) United States Patent
Rebelle

(10) Patent No.: US 7,051,973 B2
(45) Date of Patent: May 30, 2006

(54) AIRBORNE ENHANCEMENT DEVICE

(76) Inventor: Monique Rebelle, 1690 Murphy Pl., Reno, NV (US) 89521

( * ) Notice: Subject to any disclaimer, the term of this patent is extended or adjusted under 35 U.S.C. 154(b) by 0 days.

(21) Appl. No.: 10/865,553

(22) Filed: Jun. 9, 2004

(65) Prior Publication Data

US 2004/0262449 A1    Dec. 30, 2004

Related U.S. Application Data

(60) Provisional application No. 60/477,686, filed on Jun. 10, 2003.

(51) Int. Cl.
*B64C 39/00*    (2006.01)

(52) U.S. Cl. ............... 244/4 A; 244/151 R; 244/900

(58) Field of Classification Search ........... 244/138 R, 244/143, 145, 147, 148, 151 R, 900, 901, 244/4 A See application file for complete search history.

(56) References Cited

U.S. PATENT DOCUMENTS

| | | | |
|---|---|---|---|
| 2,018,062 A | 10/1935 | Hardt | |
| 2,810,985 A * | 10/1957 | Bilder | ............... 446/56 |
| 3,083,933 A | 4/1963 | Cella | |
| 4,563,969 A | 1/1986 | LeBail | |
| 4,813,634 A * | 3/1989 | Zuck | ............ 244/122 A |
| 5,082,210 A * | 1/1992 | Morehead, Jr. | ............ 244/145 |
| 5,251,853 A * | 10/1993 | Ogawa et al. | ............ 244/145 |
| 5,277,348 A * | 1/1994 | Reid | ............ 244/151 R |
| 5,366,182 A | 11/1994 | Roeseler et al. | |
| 5,713,603 A | 2/1998 | Carter | |
| 5,904,324 A * | 5/1999 | Di Bella | ............ 244/152 |
| 6,099,041 A | 8/2000 | Carter | |
| 6,824,106 B1 * | 11/2004 | Douglas et al. | ......... 244/151 R |

* cited by examiner

*Primary Examiner*—Peter M. Poon
*Assistant Examiner*—Timothy D. Collins
(74) *Attorney, Agent, or Firm*—Michael A. Kerr; Virtual Legal, P.C.

(57) ABSTRACT

An airborne enhancement device comprises a harness adapted to secure to a body of a user. A collar is coupled to the harness. A wing is coupled to the collar by at least one structural member. The wing is adjustably deployable. The wing is configured to adjust between an extended position and a folded position. A pack is coupled to the collar and is configured to store the wing in the folded position.

20 Claims, 6 Drawing Sheets

AIRBORNE ENHANCEMENT DEVICE

PRIORITY CLAIM

This application claims priority to U.S. Provisional Patent Application Ser. No. 60/477,686, filed on Jun. 10, 2003.

BACKGROUND

The present invention relates to airborne enhancement devices, and more particularly to a deployable and wearable flying device for extending the flight time of a skier, snowboarder, or the like. A desirable sensation of sliding down the mountain is enhanced by the sense of reduced body weight while getting occasional air going down. A thrill of getting airborne is enhanced by the use of jumps, ramps cliff faces and the like. During the past decade there has been a phenomenal growth in the area of freestyle skiing and snowboarding, mountain biking, motocross, acrobatics, wakeboarding, and the like. The growth and development is especially pronounced with respect to the thrill of getting airborne. Additionally, there has been tremendous growth in related activities involving flight and being airborne, such as kiting. Sports enthusiasts are in need for a new device for gaining excitement through being airborne.

Attempts of including some form of a wing coupled to a skier or snowboarder have been patented (see U.S. Pat. No. 5,071,089 to Fagan). The wings in the prior art have been bulky, cumbersome, and are not adjustable. Further, the prior art wings cannot be worn while riding a ski lift up a mountain. The prior art lifting devices fail to include adjustability as well as storage capability.

What is needed in the art is a portable, adjustable, storable, airborne enhancement device to be utilized during a downhill activity, such as skiing.

SUMMARY

The present invention relates to an airborne enhancement device and more particularly, to a deployable flying device for producing lift, and providing for an extended flight of a skier or snowboarder or other sports enthusiasts, such as mountain bikers, hikers, water skiers, wake boarders, and the like. The present invention also greatly enhances the stability of a skier either being still or being in motion and is recommended for any age and ability group.

The disclosure is directed toward an airborne enhancement device, which comprises a harness adapted to secure to a body of a user. A collar is coupled to the harness. A wing is coupled to the collar by at least one structural member. The wing is adjustably deployable. The wing is configured to adjust between an extended position and a folded position. A pack is coupled to the collar and is configured to store the wing in the folded position.

In an exemplary embodiment, the structural member is adjustable in length and adjustable in configuration. A set of collar mounts is attached to shoulder members of the harness. The collar includes padding. An attachment mechanism is employed to secure the one structural member to the collar. An opening can be disposed in the collar. The opening is adapted to receive a cord configured to fold and unfold the wing. The wing is adjustable and configured to adjust to correct and control flight. The wing and the structural member are configured to be foldable into the pack. A controller can be employed with the wing and can be configured to correct and control flight.

In another exemplary embodiment the disclosure is directed toward an airborne enhancement device comprising a harness including a shoulder member configured to secure to a torso of a user over the shoulders of the user. The harness includes a collar coupled to the shoulder member. The collar extends distally from the shoulder member and is configured to extend behind a head of the user. A wing is coupled to the harness by at least one structural member. The wing is adjustable. A pack is coupled to the harness. The pack is configured to receive said wing.

A method of using an airborne enhancement device is disclosed. The method comprises disposing the airborne enhancement device on a user. The airborne enhancement device comprises a harness adapted to secure to a body of the user. A collar is coupled to the harness. A wing is coupled to the collar by at least one structural member. The wing is adjustably deployable and configured to adjust between an extended position and a folded position. A pack is coupled to the collar and is configured to store the wing in the folded position. The method includes adjusting the harness to secure the harness to said user. The method includes deploying said wing.

BRIEF DESCRIPTION OF THE FIGURES

Referring now to the figures, wherein like elements are numbered alike.

DETAILED DESCRIPTION

The present invention provides a deployable flying device for producing lift and stability, and for providing for an extended flight of a user.

Figure 1:
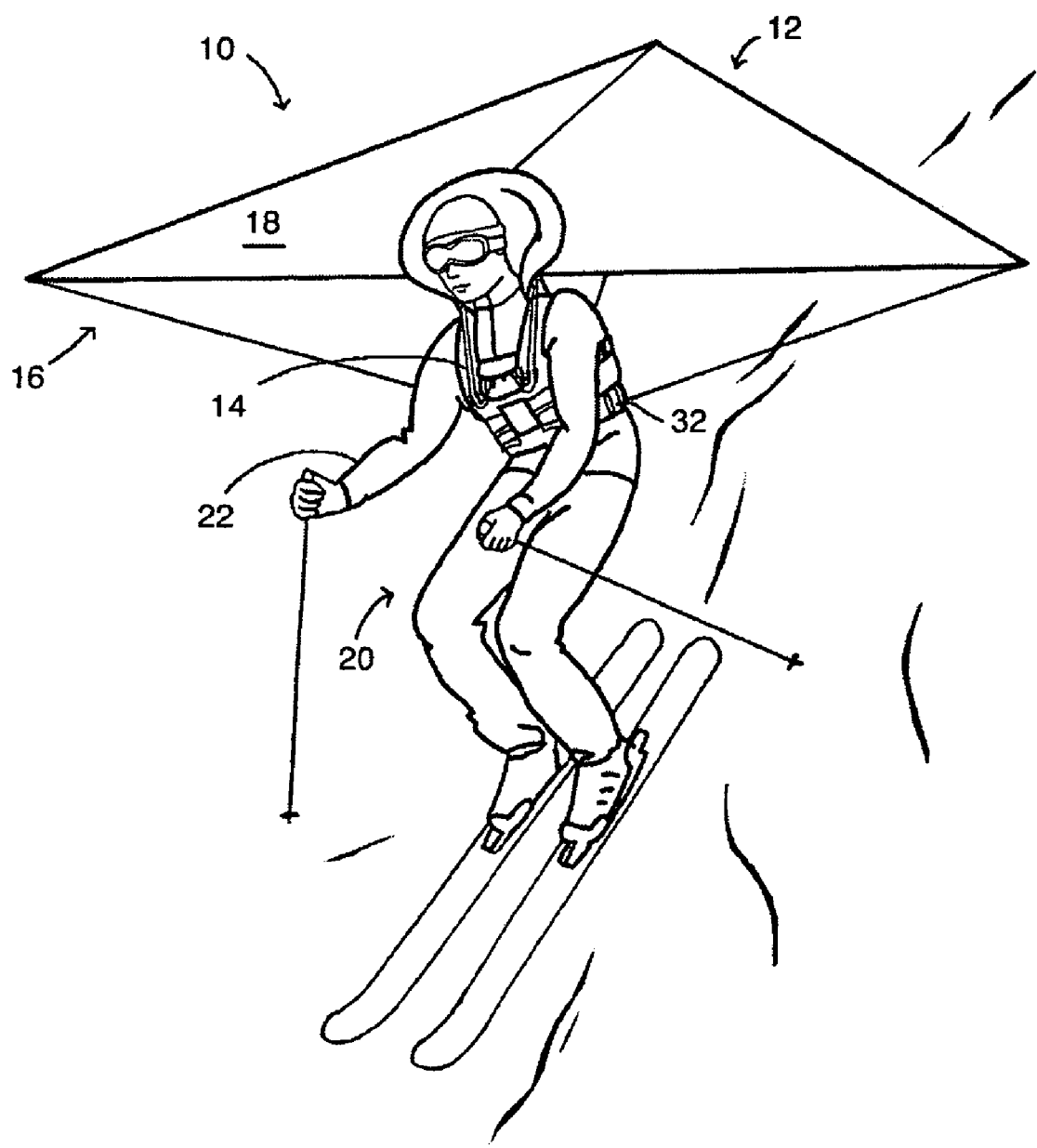
FIG. 1 is a perspective view of a skier wearing an exemplary airborne enhancement device.

Referring to FIG. 1, an exemplary airborne enhancement device 10 apparatus is illustrated in a deployed position. For the sake of simplicity, and by no means limiting, the term "skier" will be used in the description to describe the user 20 of the airborne enhancement device 10. The airborne enhancement device 10 includes a wing 12 coupled to a harness 14. The wing 12 can include at least one structural member (or simply structure) 16 that supports an airfoil 18. The airborne enhancement device 10 is worn by a skier 20 over the outerwear 22, such as a ski jacket or other appropriate clothing. The airborne enhancement device 10 harness 14 attaches over the torso of the skier 20. The harness 14 can also extend around the waist and/or the upper legs of the skier 20.

Figure 2:
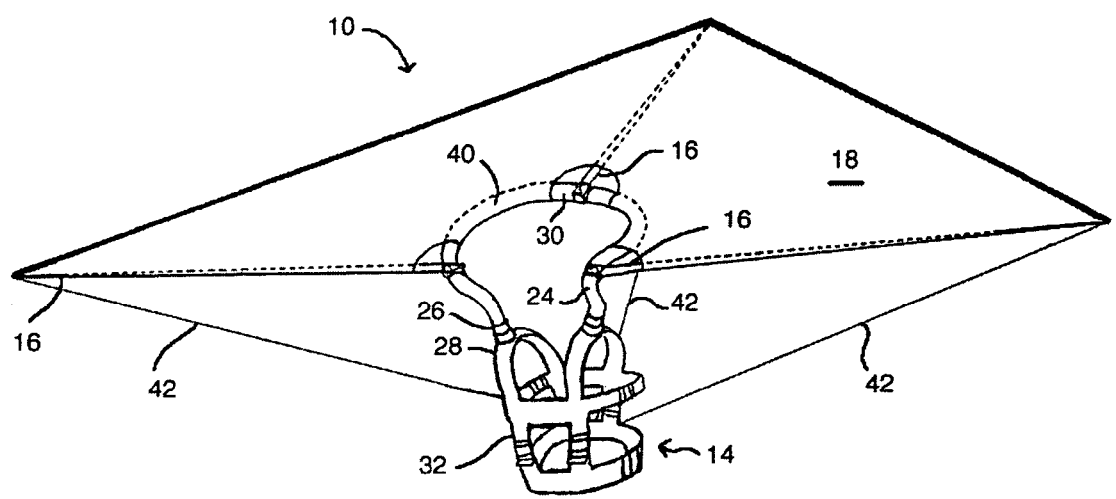
FIG. 2 is a perspective view of an exemplary airborne enhancement device with the wing extended.
Figure 3:
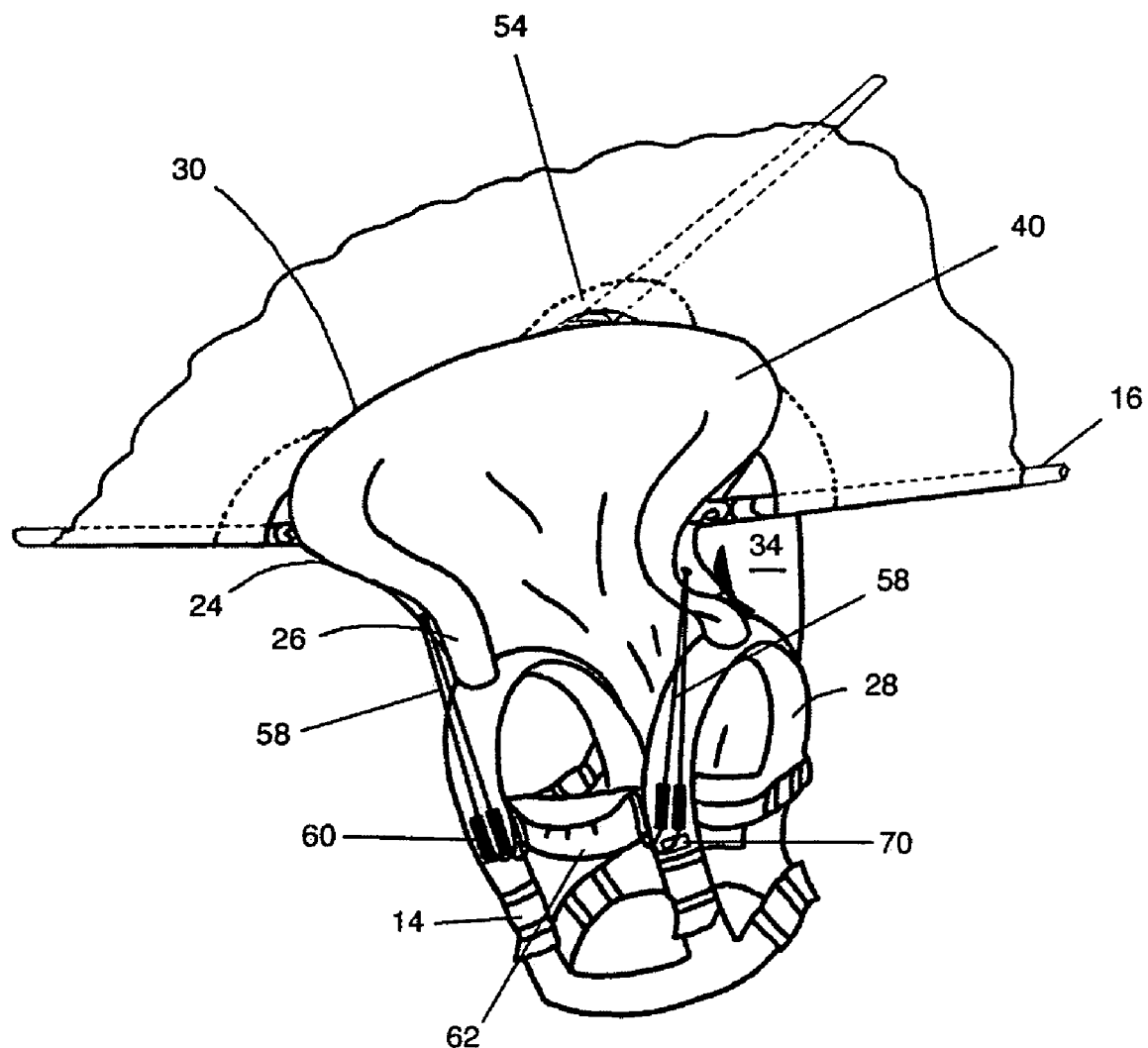
FIG. 3 is a perspective view of an exemplary harness and collar mechanism.
Figure 4:
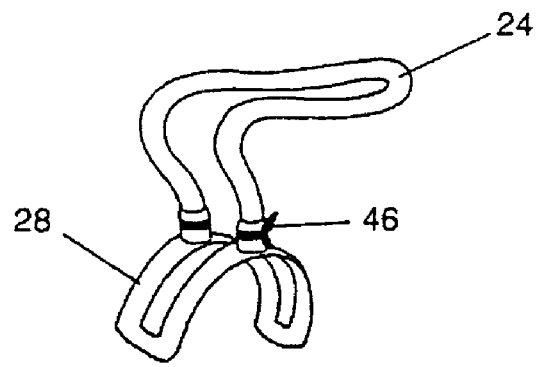
FIG. 4 is a side perspective view of an exemplary harness and collar mechanism.

As illustrated in FIGS. 1 and 2, the wing 12 can include at least one structural member 16 that provides a framework that supports and gives shape to the airfoil 18. The structural members 16 can be adjustable in length as well as being adjustable in configuration. For example, the structural members 16 can be extended to deploy the airfoil 18. The structural members 16 can also retract or fold, in some manner, to facilitate storage into a pack (or backpack or pouch) 34 (see FIGS. 7–8). In either case, locking mechanisms can be employed to aid in holding the wing 12 deployed or in containing the collapsed wing 12 (see FIG. 5).

The structural member 16 can comprise rods, cables, and other elements, such as pipe, channel bar, cordage, and the like. The structural member 16 can include rigid elements and/or flexible elements that can vary or be altered to change the foil shape or to support a variety of different airfoils 18. The structural member 16 can be threadable or spring loaded for connecting to employ the wing 12. Flexible cords 42 attach to the structural members 16 and to the harness 14.

Referring to FIGS. 2, 3, 4 and 5, an exemplary embodiment of the airborne enhancement device 10 is illustrated. The airborne enhancement device 10 comprises the wing 12 including the airfoil 18 deployable on the structural member 16. The structural member 16 is coupled to the harness 14 via a collar 24. The attachment of the structural member 16 to the collar 24 can also be adjustable.

The collar 24 comprises a set of collar mounts 26 attached to shoulder members 28 of the harness 14. The collar 24 also includes a collar cross member 30 coupled to the collar mounts 26. The collar cross member 30 can support the structure 16. The collar mounts 26 and the collar cross member 30 can be adjustable. A variety of wings 12 can be accommodated by utilizing the adjustable collar 24. The collar 24 can be adjustable to allow for greater visibility for the skier 20 and for optimal flying experience. In one embodiment, the collar 24 includes an extension 44 to accommodate different sized users. The extension 44 can also have a locking mechanism 46, such as a clamp, and the like.

The collar 24 can include padding 40 disposed over the more rigid elements, such as the collar mounts 26 and collar cross members 30. The padding 40 provides protection for the skier's head. Foam, air pillows, layered materials, and the like, can be utilized for the padding 40. The padding 40 can be attached to the collar 24 by attachment means such as hook and loop fasteners, snaps, clips, and the like. In another embodiment, the collar 24 can be covered with a material that provides extra padding or cushion, such as neoprene, and the like. Likewise, the harness 14 and structural members 16 can be covered with a material that provides extra padding or cushion, such as neoprene, and the like. The material can be permanently applied or temporarily applied using attachment means such as hook and loop fasteners, snaps, clips, releasable adhesive, and the like.

Figure 5:
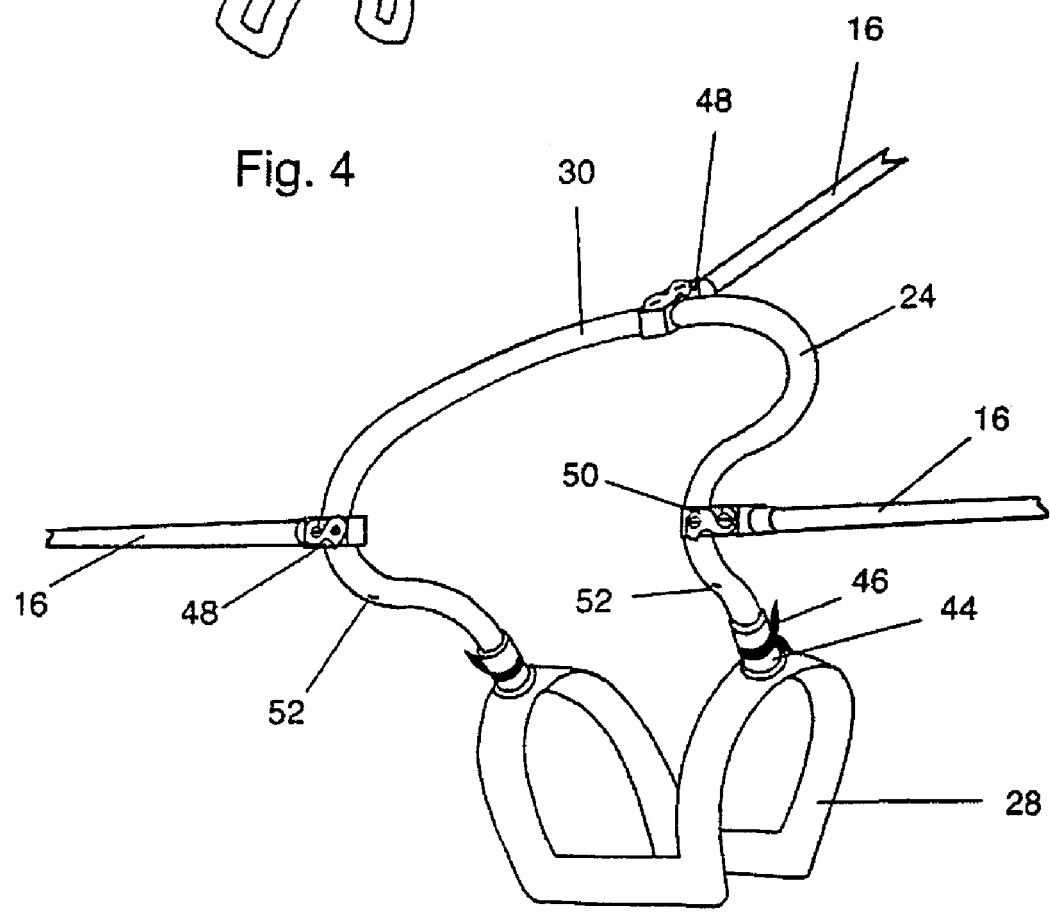
FIG. 5 is a perspective view of an exemplary harness and collar mechanism.

In some embodiments, as illustrated in FIG. 5, attachment mechanisms can be employed to secure the structural members 16 to the collar 24. A hinge 48 or other device can be utilized in securing the structural member 16 to the collar. A hinge 48 can provide for adjusting the angle of the wing 12. Further, a latch mechanism 50 can be engaged to secure the structural member 16 to the collar 24 when the wing 12 is deployed. Likewise, the latch mechanism 50 can be disengaged when folding the wing 12 for storage and utilized to lock the folded wing in place. An example of a latch mechanism 50 is an "s" hook, friction tube, threadable connector, latch pins, and the like.

In some embodiments, as illustrated in FIG. 5, openings 52 can be disposed in the collar 24. The openings 52 are adapted to receive mechanisms for the cords (not shown) to allow for folding and unfolding of the wing 12.

Referring again to FIGS. 1, 2, and 3, the harness 14 supports the collar 24 at the shoulder members 28. The harness 14 can be any material that is sturdy enough to support the user and the weight of the wing 12. The harness 14 can be of a rigid or semi-rigid material, such as nylon webbing, canvass, rope, other webbing materials, and the like. In one embodiment, the harness is adjustable to fit to various sized users. The shoulder members 28 can be reinforced to provide the necessary structural support to the collar 24. The shoulder members 28 can be of a rigid or semi-rigid material, such as aluminum alloy, steel alloy, carbon fiber composite, plastics, epoxy, and the like. As stated earlier, the harness 14 can be any material that is sturdy enough to support the user and the weight of the wing 12. In a preferred embodiment, the harness 14 is comprised of a material that provides comfort and adjustability. Preferred means of adjusting the harness 14 includes belts, straps, buckles, clips, and the like. Cords 58 can be employed to adjust the wing 12, structural members 16, and airfoil 18. A cinch mechanism 60 can be coupled to the collar 24, shoulder member 28 and harness 14 to support and secure the cords 58. In an exemplary embodiment, the cinch mechanism 60 can be clam cleats or other cleat mechanisms that can be used to secure the cord 58. A pouch 62 can be employed to stow the cord 58 when excess lengths of cord 58 are present.

Figure 6:
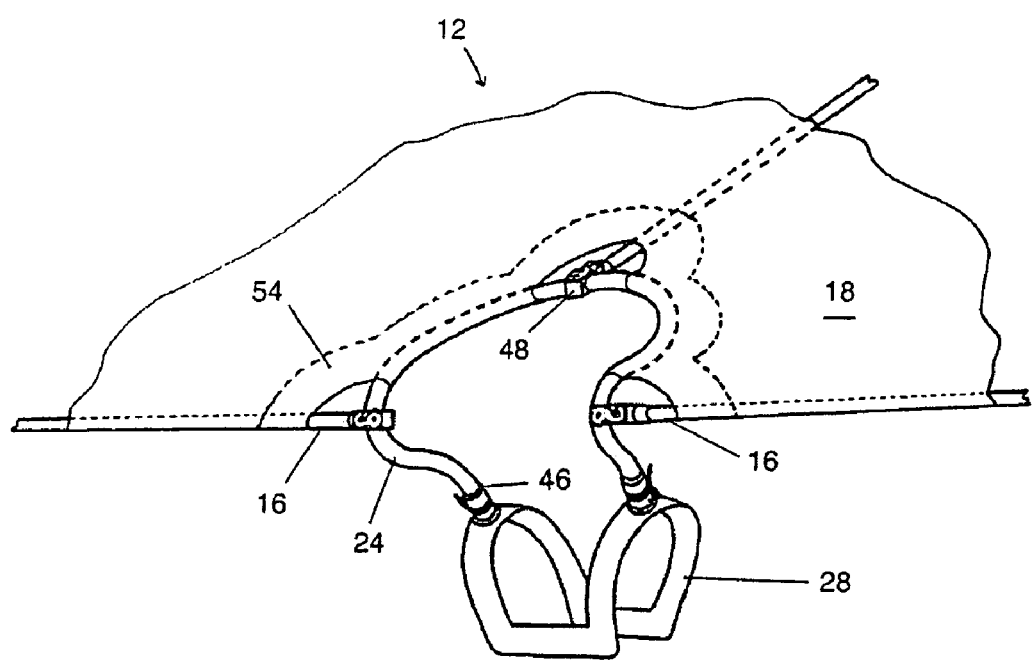
FIG. 6 is a perspective view of an exemplary harness and collar mechanism.

FIG. 6 illustrates the collar 24 having a reinforced fabric 54 that is connected to the airfoil 18 and to the collar 24. The reinforced fabric 54 can be incorporated into the material of the airfoil 18. For ease in deploying the wing 12, the reinforced fabric 54 can be attached to the collar 24 by attachment means, such as hook and loop fasteners, snaps, clips, releasable adhesive, and the like.

Figure 7:
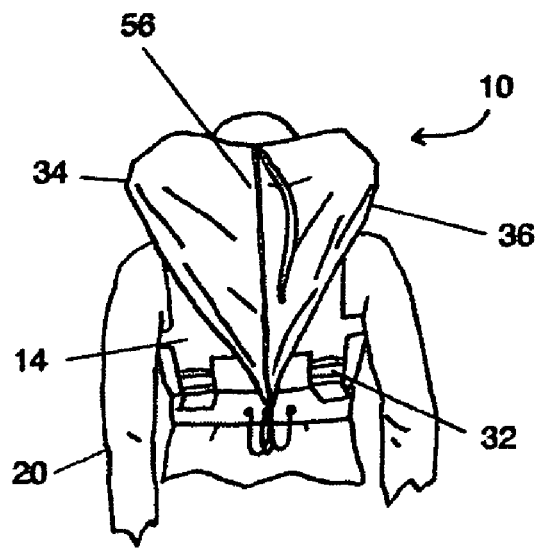
FIG. 7 is a rear view of exemplary collapsed wings packed into an exemplary pack on the back of the collar mechanism.
Figure 8:
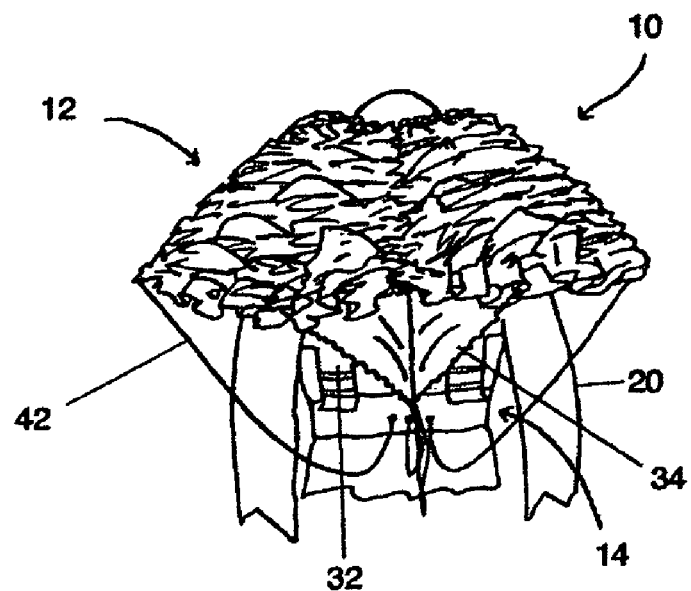
FIG. 8 is a rear view of a skier wearing the airborne enhancement device when collapsed.

As illustrated in FIGS. 1, 7 and 8, the harness 14 also includes straps 32 that encircle the skier 20 at various locations in order to secure the airborne enhancement device 10 to the skier 20. The straps 32 can be flexible as well as adjustable.

The airfoil 18 can be a sheet(s) of fabric, composite material, Mylar®, nylon weave, and the like. It is contemplated that the airfoil material can be a lightweight material such as those materials used in sails, hang gliders, parachutes, parasails, kites, and the like. The preferred material should be a material that can withstand the force of the wind while in flight and the lift forces generated during flight, support a user flying, as well as the flexible nature of being able to be folded into a pack 34. In alternative exemplary embodiments, the airfoil 18 can couple directly to the collar 24. When extended, the airfoil 18 is taut in order to provide for lift.

While FIGS. 1 and 2 illustrate a substantially triangular wing 12, other shapes and configurations are contemplated, and the disclosure is not limited to only one shape. The shape of the wing 12 can be altered. For example, conditions can influence the shape of the wing 12, such as weather, terrain, and the level of experience of the skier 20. The wing 12 can have greater or lesser dihedral for stability and large or small lift characteristics depending on the ability of the skier 20. The wing 12 can be modified while in use to provide different flight characteristics during use. For example, the wing 12 can be set with high stability in difficult terrain to aid in balancing the skier 20 and then adjusted for long glide capability when approaching a ski jump (not shown).

In another example, the wing 12 can be retracted to provide low drag, enabling the skier 20 to gain ground speed and then adjusted to provide high lift enabling the skier 20 to get airborne. The airborne enhancement device 10 can be adapted for use by beginners, intermediates and expert skiers depending on the experience and expected level of enjoyment of use. There are virtually unlimited variations in the deployment of the airborne enhancement device 10. The airborne enhancement device 10 can greatly extend and enhance the airborne sensation. The airborne enhancement device 10 can improve the stability of the skier 20 in motion as well as standing still.

As illustrated in FIGS. 6–8, the structural member 16 and airfoil 18 are deployable as well as storable. The structure 16 and airfoil 18 can retract, fold and collapse into a substantially smaller volume for ease of transport and storage. The structural members 16 can be telescoping and retract in a telescopic fashion, in a preferred exemplary embodiment.

As illustrated in FIGS. 7–8, a packet (or pocket or pouch or backpack) 34 can be coupled to the collar 24 at the collar cross member 30 and the collar mounts 26. The pack 34 can be employed to store the wing 12. The pack 34 comprises a shell 36 material, such as fabric, mesh, and the like, that can contain the structural member 16 and wing 12 stored therein. The shell 36 can be flexible to allow for ease of storage. The pack 34 can include cinches 60 and/or cord 58 to retain the shell 36. In one embodiment, the pack 34 can be accessible by a zipper 56 as illustrated in FIG. 7. The pack 34 provides containment as well as protection for the structure 16 and airfoil 18. The elements, such as rain, snow and wind are shielded from the stored structure 16 and airfoil 18. The pack 34 can be of any shape or size as long as the folded wing 12 can fit inside the pack 34. In one embodiment, the pack 34 can have a pouch 62 for holding extra ropes, tools, or personal items.

It is contemplated that in alternative exemplary embodiments, the wing 12 can be equipped with flight enhancing features that control lift and flight path. Flaps, foils and control means, such as a cord, can be employable with the structure 16 and the airfoil 18 in order for the skier 20 to alter flight path and flight duration. The control means can be manipulated by the arms or legs or head of the skier 20.

It is also contemplated that electronic control means can be employed with the wing 12 to automatically correct and control flight. Control arms, servos, and the like, can adjust the structure 16 and/or airfoil 18 to maintain flight paths or duration and the like. The control means can be mounted to the airborne enhancement device 10 proximate the harness 14 and/or the collar 24.

In yet another exemplary embodiment, the airborne enhancement device 10 can be equipped with the automatic controllers 70 coupled to the cords 58 (shown in FIG. 3) and other control means and can include wireless transceiver devices.

For example, as the skier 20 departs the ski lift (not shown), a wing based transceiver can send signals indicating a desired experience to a mountain based transceivers. The mountain based transceivers can reply with certain signals directing the wing 12 to deploy in a certain configuration.

Skiers 20 can program the airborne enhancement device 10 to automatically configure based on predetermined desires and needs. Factors, such as snow conditions, wind, precipitation, the volume of skiers on the trails, light levels, temperature, degree of difficulty of the trail, and the like, can be factored into the programming and type of deployment of the airborne enhancement device 10.

In use, the airborne enhancement device 10 can be worn by a skier 20 around the upper body over the outerwear 22. The harness 14 having adjustable straps 32 can be securely fastened to the skier 20. The airborne enhancement device 10 can be donned similarly to a backpack. The wing 12 can be in a stored position inside the pack 34. With the wing 12 stored inside the pack 34, the skier 20 can maneuver, enter, ride and exit a ski lift easily. Once the skier 20 has ascended the mountain, the wing 12 can be removed from storage and deployed manually and/or automatically. The adjustable wing 12 can be set into a preferred foil shape and size. The skier 20 begins the descent and gains velocity. As the relative wind speed over the airfoil 18 reaches a determined range, the wing 12 develops lift. The skier 20 is lifted by the airborne enhancement device 10 and experiences a reduction in weight relative to the skis on the snow. If the skier 20 desires greater flight, the skier 20 develops greater downhill speed and creates more lift from the wing 12. The skier 20 can experience flight downhill on the airborne enhancement device 10. If greater flight time is desired, the skier 20 can utilize a ski jump, cliff or other feature traditionally used to go airborne along the mountain.

While the present invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An airborne enhancement device comprising:
   a harness adapted to secure to a body of a user;
   a collar coupled to said harness;
   a wing comprising at least one structural member and an airfoil coupled to said structural member, said wing coupled to said collar by said structural member, said wing being adjustably deployable and configured to adjust between an extended position and a folded position;
   at least one cord configured to interface with said collar for folding and unfolding said wing; and
   a pack coupled to said collar and configured to store said wing in said folded position.

2. The airborne enhancement device of claim 1, wherein said at least one structural member is adjustable in at least one of length and configuration.

3. The airborne enhancement device of claim 1, wherein said collar comprises a set of collar mounts attached to shoulder members of said harness.

4. The airborne enhancement device of claim 1, wherein said collar includes padding.

5. The airborne enhancement device of claim 1, further comprising: at least one attachment mechanism employed to secure said at least one structural member to said collar.

6. The airborne enhancement device of claim 1, further comprising: at least one opening disposed in said collar, said at least one opening adapted to receive at least one cord configured to fold and unfold said wing.

7. The airborne enhancement device of claim 1, wherein said wing is adjustable and configured to adjust to correct and control flight.

8. The airborne enhancement device of claim 1, wherein said wing and said at least one structural member are configured to be foldable into said pack.

9. The airborne enhancement device of claim 1, further comprising: a controller employed with said wing and configured to correct and control flight.

10. An airborne enhancement device comprising:
- a harness including a shoulder member configured to secure to a torso of a user over the shoulders of said user, said harness including a collar coupled to said shoulder member, said collar extending distally from said shoulder member and configured to extend behind a head of said user;
- a wing comprising at least one structural member and an air foil coupled to said structural member, said wing coupled to said harness by said structural member, said wing being adjustable;
- at least one cord configured to interface with said collar for folding and unfolding said wing; and
- a pack coupled to said harness, said pack being configured to receive said wing.

11. The airborne enhancement device of claim 1, wherein said wing is configured to adjust to control flight.

12. The airborne enhancement device of claim 1, wherein said wing includes at least one structural member adjustable in size and configured to adjust said airfoil of said wing, wherein said wing is deployable for flight and foldable for storage in said pack.

13. The airborne enhancement device of claim 1, further comprising: a controller coupled to said wing, said controller being configured to control aerodynamic characteristics of said wing.

14. A method of using an airborne enhancement device comprising:
- disposing the airborne enhancement device on a user, the airborne enhancement device comprising:
  - a harness adapted to secure to a body of said user;
  - a collar coupled to said harness;
  - a wing comprising at least one structural member and an air foil coupled to said structural member, said wing coupled to said collar by said structural member, said wing being adjustably deployable and configured to adjust between an extended position and a folded position;
  - at least one cord configured to interface with said collar for folding and unfolding said wing: and
  - a pack coupled to said collar and configured to store said wing in said folded position; adjusting said harness to secure said harness to said user; and deploying said wing.

15. The method of claim 14, further comprising: adjusting said at least one structural member in length and in configuration; and adjusting said wing to provide flight characteristics.

16. The method of claim 14, further comprising: adjusting said collar to fit a variety of said users.

17. The method of claim 16, further comprising: adjusting said wing during flight to create different flight characteristics.

18. The method of claim 14, further comprising: padding said collar.

19. The method of claim 14, further comprising: supporting said user during flight on said airborne enhancement device.

20. The method of claim 14, further comprising: stowing at least one of said wing and said at least one support structure in said pack.

* * * * *